(12) United States Patent
Gonzalez et al.

(10) Patent No.: US 12,419,333 B2
(45) Date of Patent: Sep. 23, 2025

(54) METHOD FOR CRYSTALLISING AQUEOUS CARBOHYDRATE-CONTAINING SUBSTANCES AND CRYSTALLIZED PRODUCT OBTAINED

(71) Applicants: Isaac Andrade Gonzalez, Tlajomulco de Zuniga (MX); Luis Valentino Ramírez Cortes, Guadalajara (MX)

(72) Inventors: Isaac Andrade Gonzalez, Tlajomulco de Zuniga (MX); Luis Valentino Ramírez Cortes, Guadalajara (MX); Alejandra Chavez Rodriguez, Tlajomulco de Zuniga (MX); Vania Sbeyde Farias Cervantes, Tonala (MX)

( * ) Notice: Subject to any disclaimer, the term of this patent is extended or adjusted under 35 U.S.C. 154(b) by 200 days.

(21) Appl. No.: 17/914,302

(22) PCT Filed: Feb. 17, 2021

(86) PCT No.: PCT/MX2021/000005
§ 371 (c)(1),
(2) Date: Sep. 23, 2022

(87) PCT Pub. No.: WO2021/194332
PCT Pub. Date: Sep. 30, 2021

(65) Prior Publication Data
US 2024/0206510 A1      Jun. 27, 2024

(30) Foreign Application Priority Data
Mar. 23, 2020   (MX) .................... MX/a/2020/003269

(51) Int. Cl.
*A23L 21/25*   (2016.01)
*A23L 5/20*    (2016.01)
*A23L 5/30*    (2016.01)

(52) U.S. Cl.
CPC ................. *A23L 21/25* (2016.08); *A23L 5/21* (2016.08); *A23L 5/276* (2016.08); *A23L 5/32* (2016.08);
(Continued)

(58) Field of Classification Search
CPC .. A23P 10/20; A23L 21/25; A23L 5/32; A23L 5/36; A23V 2300/31; A23V 2300/40
See application file for complete search history.

(56) References Cited

U.S. PATENT DOCUMENTS 4,529,608 A  *  7/1985  Szejtli .................... A23L 21/25
                                                                 127/29

FOREIGN PATENT DOCUMENTS

CN      104886432 A  *  9/2015
CN      106376883 A  *  2/2017
(Continued)

*Primary Examiner* — Michele L Jacobson
(74) *Attorney, Agent, or Firm* — Michael D. Eisenberg

(57) ABSTRACT

A method for crystallizing aqueous carbohydrate-containing substances, comprising: purifying the aqueous substance containing carbohydrates; mixing said aqueous substance with a water-absorbing medium; distributing the above mixture in a layer on a high temperature resistant container; heating the mixture layer of the previous step in a microwave apparatus; cooling the mixture layer; re-heating and cooling the mixture layer until it reaches a humidity of 2 to 4%; spraying the crystallized mixture-layer, removing the water-absorbing medium from the crystals obtained; and recovering said crystals. A crystallized or granular product obtained by such a crystallization method.

9 Claims, 2 Drawing Sheets

(52) U.S. Cl.
CPC ............ *A23L 5/36* (2016.08); *A23V 2300/02* (2013.01); *A23V 2300/20* (2013.01); *A23V 2300/24* (2013.01); *A23V 2300/31* (2013.01); *A23V 2300/38* (2013.01); *A23V 2300/40* (2013.01)

(56) References Cited

FOREIGN PATENT DOCUMENTS

| | | | | | |
|---|---|---|---|---|---|
| CN | | 108618065 A | * | 10/2018 | ............ A23P 10/40 |
| WO | WO-2009064154 A1 | | * | 5/2009 | ............ A23L 19/01 |

* cited by examiner

METHOD FOR CRYSTALLISING AQUEOUS CARBOHYDRATE-CONTAINING SUBSTANCES AND CRYSTALLIZED PRODUCT OBTAINED

TECHNICAL FIELD OF THE INVENTION

The present invention relates to the technical fields of Chemistry, and Food Technology, as it provides a method for crystallizing aqueous substances containing carbohydrates; as well as it also relates to the crystallized product obtained by said method.

BACKGROUND OF THE INVENTION

Normally, bee honey and agave syrup are obtained using spray dryer, freeze-dryer or various types of dryers; hot air, vacuum and vacuum microwave; some of which use high temperatures affecting the honey's aromas and color, and others are affected by long operating times and expensive technologies such as freeze-drying.

Patent document CN108541918 A describes a process for crystallized honey consisting of low temperatures, heating and stirring to obtain a crystallized honey product. Wherein they contemplate a preferred method: in step (iv), allowing the mixed honey to stand for crystallization for 46 h at 12-15° C., heating to 35-40° C., stirring and heating for 2-3 h, cooling to 12-15° C. and allowing to stand for 4-6 h, repeating the above steps for 5-8 times and allowing to stand at 12-15° C. In step (iv) the agitation in step is 100-200 rpm. In step (i) the honey crystal is pulverized by a colloid mill to a particle size of 10-20 μm. In step (iii) the ratio of liquid honey to seed crystal is 9:1-15:1. In step (iii) the compressed air filling rate is 0.1-0.5 L/min. The agitation speed is 50-100 rpm. The preferred raw material in step (ii) can be: wild flowering honey, rapeseed honey, cotton honey, blue tumbergia and loquat honey, loquat honey, lychee honey, flower variety honey, linden honey, sunflower honey, and or laurel honey.

Patent document CN106901289 A discloses a method for producing solid crystals of honey, by a traditional crystallization system consisting of vacuum concentration, nucleation and cooling crystallization; which comprises collection, 10-18% water content and over 40% glucose content, pure natural honey and filtration to remove impurities heat in water bath at 45-50° C. for 15-20 min vacuum concentrate, sterilization at 60° C. for 20-30 minutes, monitoring by refractometer, Baume honey selection at over 41.6° ° C. and sieving; heat honey at 42-44° C. for 15-20 minutes, add seed crystal in a 1:8 ratio, shake, cool to 30° C. and pump into sterilized honey barrels and seal, cool for 10 h at 16-18° C. and cold storage. However, the characteristic flavor and color of the honey are lost.

In turn, patent document CN105815720A describes a method for stabilizing crystallized honey by blending honey and freezing, but preserved at room temperature in liquid form. It mainly consists of: step (a) grinding and puffing raw honey and adding 0.5-10% crystalline honey; step (b) involves freezing at −10° C. or below, preferably −18 to −21° C. for 24-72 hours, chilling at 0-7° C. in the refrigerator for 24-36 hours and incubating at below 10-16° C. for 3-7 days. Preferred composition: The crude honey comprises 53% less fructose as reducing sugar.

Whereas, patent document JP55165760 A refers to a mixture of honey with fructose, glucose and polysaccharide such as LM pectin, to stabilize the small crystals in the suspension homogeneously. It mainly consists of (a) combining low methoxy pectin (LM pectin) in a ratio of 2-4% in honey or honey mixture obtained by mixing honey with liquid glucose, liquid fructose, etc., (b) stirring the mixture well and cooling it to below 27° C., (c) adding to the obtained liquor, 10-15% of a suspension of seed crystal obtaining 30% calcium phosphate or aqueous calcium sulfate, to the crystalline honey and kneading the mixture, (d) stirring the mixture well, (e) packing it in a container and (f) leaving it to stand at 0-15° C. for 3-5 days. Crystalline honeys that are composed of uniform fine crystals, show a smooth texture and are stable to temperature changes, can be easily prepared. They can be used for nutritious foods, sophisticated foods, etc. ML pectin is less pH sensitive than high methoxy pectin, but can form gels with divalent metals such as calcium. The calcium salt serves as a gelling agent for LM pectin, to reduce the sugar concentration of the mixture obtained and thus give fine, uniform crystals.

As can be seen, the disadvantages of conventional crystallization methods to obtain honey and solid syrup are that they use a lot of time, temperature, vacuum and cooling for the thermal change to form crystals of solid honey and some others, only crystallize part of the honey to provide stability in the concentrated suspension, which does not protect the organoleptic characteristics of honey and syrups. Therefore, it is important to generate technologies that protect the organoleptic characteristics of the substances to be crystallized, using means or substances that help to buffer microwave energy and water evaporation, to form crystals while preserving the flavor, color and other characteristics of nutritional interest of the substances during their different stages of crystallization.

In order to counteract the above mentioned drawbacks, a method has been developed for the crystallization of carbohydrate-containing substances such as honeys and syrups.

BRIEF DESCRIPTION OF THE DRAWINGS

The characteristic details of the present invention are clearly shown in the following detailed description of some of its preferred embodiments and accompanying figures, by way of illustrative examples, but not limiting, wherein.

DETAILED DESCRIPTION OF THE INVENTION

Figure 1:
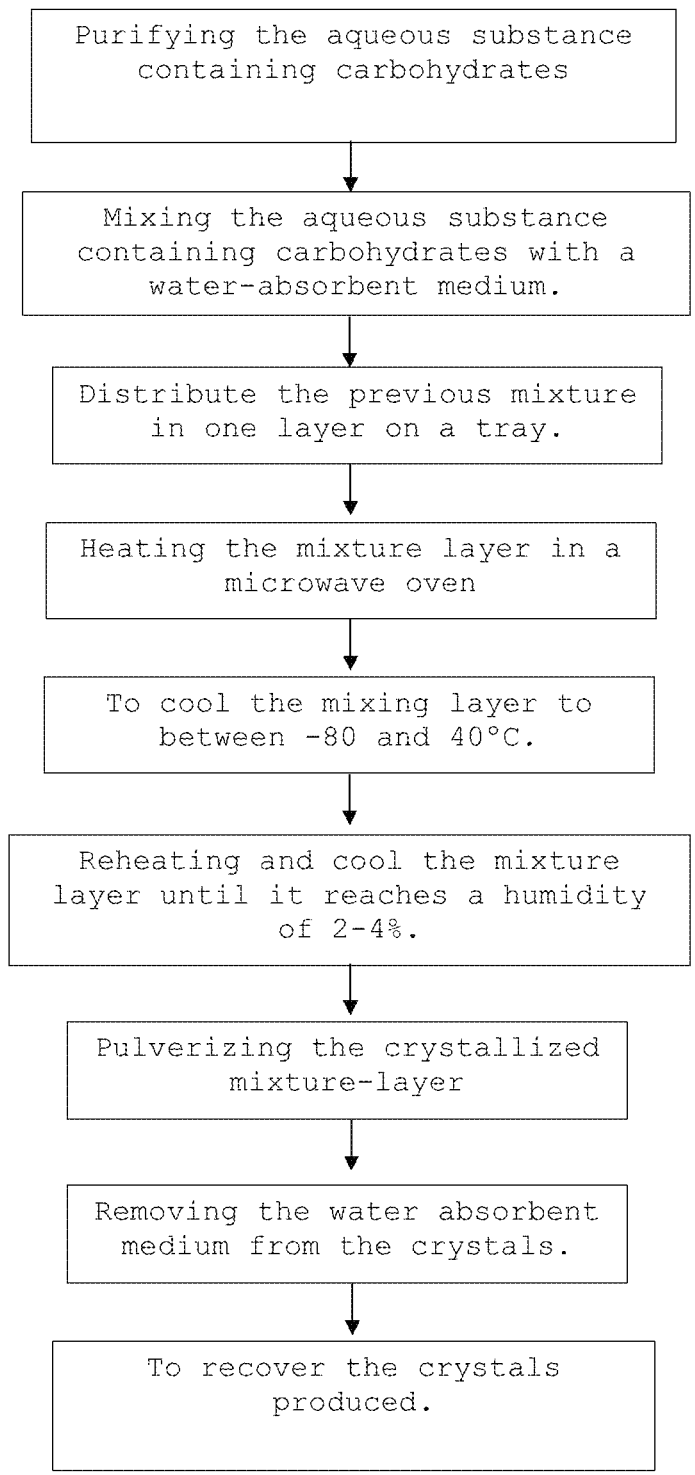
FIG. 1 is a flow diagram of the method for the crystallization of carbohydrate-containing substances, in accordance with the present invention.

An object of the present invention, is a method for crystallizing aqueous substances containing carbohydrates, whereby advantage is taken of the crystallization characteristic of such carbohydrates, for example, bee honey and syrups of vegetable origin. With this method the sensory properties and characteristic sweetness of the crystallized substances are preserved; furthermore, with this method crystallization is carried out in less time, as compared to conventional crystallization methods.

In this case, with the expression "aqueous substances containing carbohydrates", we will include, but not limited, to all those aqueous substances which comprise carbohydrates and which can be crystallized with this crystallization method as proposed by the present invention; where what is pursued is to give these aqueous substances containing carbohydrates, a presentation similar to that of sugar (sugar crystals and sugar powder).

The method for crystallizing aqueous carbohydrate-containing substances, according to the present invention, comprises the following steps:

Remove foreign matter that may be contained in the carbohydrate-containing aqueous substance; one way to remove foreign matter from the carbohydrate-containing aqueous substance is by means of a rotating filter with a 70 mesh screen at 1000 rpm for 1 min.

Mix the purified aqueous carbohydrate-containing substance with at least one water-absorbing medium in a 3:4-5 ratio until homogeneity is achieved in semi-solid particles of 3 mm on average; the water-absorbing medium may be D10-D20 maltodextrin, beta-cyclodextrin, starches, and/or a combination thereof, to cite a few examples. Mixing of the carbohydrate-containing aqueous substance and the water-absorbing medium can be done in a mixing apparatus at 70 rpm for 5 min.

Distribute the above mixture in a layer 1 to 5 mm thick on a high temperature resistant container, as it is subjected to heating in a microwave oven, at a power of 0.585 kWh per 1 kg of mixture, for 30 to 180 s.

Cooling the mixed layer at a temperature from −80 to 40° C. for 2 to 480 s, where the cooling of the mixed layer is done by removing it from the microwave apparatus and allowing it to cool to room temperature and/or placing it in a freezer apparatus, hence the wide range of the cooling temperature, which depends on the time available to carry out the crystallization method.

Repeat the heating and cooling stages consecutively and alternately until the mixture layer reaches a humidity of 2 to 4% and thus crystallization; where the number of consecutive and alternating repetitions depends very much on the aqueous substance containing carbohydrates, e.g., for bee honey and agave syrup, it is 8 repetitions.

Pulverizing the crystallized layer-mixture to obtain crystals with an average particle size of 2 mm, where the pulverizing of the crystallized layer-mixture is done in a pulverizing apparatus with a 70 mesh screen.

To remove the absorbent medium from the crystals of an aqueous substance containing carbohydrates, by vibration and screening with number 80 mesh, until the absorbent medium is completely separated; such removal can be done with a vibrating separation equipment with number 80 mesh.

Finally, recover the crystals of an aqueous substance containing carbohydrates.

The complete method time for all crystallization stages ranges from 2 to 4 h.

With this crystallization method we obtain an aqueous substance containing carbohydrates in a powder presentation, which maintains its organoleptic characteristics, such as flavor, color and aroma, with high content of fructose, glucose, sucrose, amino acids, vitamins and proteins, typical characteristics of aqueous substances containing carbohydrates. This powder of crystals obtained is completely soluble in water, not very hygroscopic, being very stable with a long shelf life.

The advantage of this method is that it takes advantage of the crystallization characteristic of sugars in aqueous substances that contain them, such as honey and syrups of vegetable origin, by applying an absorbent medium of humidity, heat and cooling that helps to form the crystal, trapping the characteristic constituents of these aqueous substances rich in sugars, and absorbing the energy produced by microwaves. The absorbent medium has the characteristic of releasing the crystals formed and facilitating the separation of the crystals from the absorbent medium by sieving. The various stages of microwave heating and slow or rapid cooling of the mixture of aqueous substances rich in carbohydrates and absorbent medium, considerably reduce the operating time, compared to the systems used to obtain solid honey, which range from 4 to 10 h, and this method reduces it to 2 h.

Therefore, the present invention also has as an object a crystallized or granulated product of aqueous substance containing carbohydrates, obtained by the method in accordance with the present invention, which has a presentation of similar to conventional sugar.

EXAMPLES

The following examples are included by way of illustration of some embodiments of the present invention, and thus should not be considered as limiting the present invention.

Example 1. Method to Obtain Crystallized Bee Honey

Step 1. One kg of bee honey was filtered with a rotary filter EXMEX model EXZAC that had a mesh number 70, at 1000 rpm, during 1 min. This in order to leave the honey free of impurities. The purified honey had a solids concentration of 80 to 83° Brix, and a light amber to dark amber color.

Step 2. The purified bee honey was mixed with maltodextrin D10 (absorbent medium) in a 3:5 ratio, until it had a homogeneity in semi-solid particles of 3 mm on average, in a KITCHENAID® mixer model KSM8990ER, at 70 rpm, for 5 min.

Step 3. The above mixture was distributed in a 4 mm thick layer on a high temperature resistant plastic tray.

Step 4. The plastic tray with the mixture distributed in layers was heated in a PANASONIC® microwave equipment model NN-SB636BRUH, for 2 min, where the heating temperature was an average of 85° C.

Step 5. The tray with the mixture layer was removed from the microwave apparatus and left at room temperature with aeration for 8 min, until it reached a temperature of 40° C.

Step 6. Steps 4 and 5 were repeated consecutively 8 times until the honey+maltodextrin mixture layer reached a moisture content of 3.4% and thus crystallization.

Step 7. The crystallized layer-mixture was removed from the tray and pulverized in a POLIMIX® and model PX-MFC 90D pulverizer with a 70 mesh screen, obtaining crystals with an average particle size of 2 mm.

Step 8. The crystals obtained were subjected to a vibratory separation equipment with mesh number 80 to separate the maltodextrin D10, the time of subjection to the vibration was until the maltodextrin D10 was completely separated.

Step 9. The honey crystals, already free of maltodextrin D10, obtained in the previous step, had a hygroscopicity of 0.1 g/h, and color of light or dark amber honey.

Figure 2:
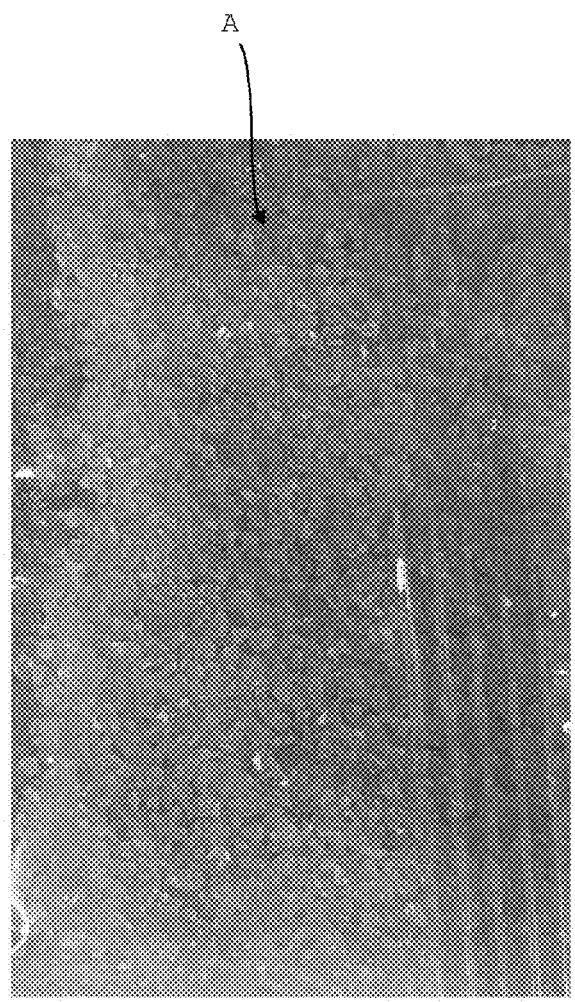
FIG. 2 is a photograph showing a crystallized or granulated honey product, which is very similar to that of a sugar product.

FIG. 2 shows the crystallized or granulated bee honey, which was obtained with the method described in this example 1, where you can see its crystals (A) very similar to the crystals of conventional sugar.

Example 2. Method to Obtain Crystallized *Agave tequilana* Wever Syrup

Step 1. 1 L of *Agave tequilana* Wever syrup was filtered with a rotary filter EXMEX model EXZAC that had a mesh number 70, at 1000 rpm, for 1 min. This in order to leave the agave syrup free of impurities. The purified syrup had a concentration of solids between 70 and 75° Brix of light or dark yellow color.

Step 2. Mix the agave syrup with the absorbent medium in a 3:4 ratio, until it is completely homogeneous in semi-solid particles of 4 mm on average, in a KITCHENAID® mixer model KSM8990ER, at 70 rpm, for 5 min.

Step 3. The above mixture was distributed in a 4 mm thick layer on a high temperature resistant plastic tray.

Step 4. The plastic tray with the mixture distributed in layers was heated in a PANASONIC® microwave equipment model NN-SB636BRUH, for 2 min, where the heating temperature was IN average 85° C.

Step 5. The tray with the mixture layer was removed from the microwave apparatus and left at room temperature with aeration for 8 min, until it reached a temperature of 40° C.

Step 6. Steps 4 and 5 were repeated consecutively 8 times until the syrup+maltodextrin mixed layer reached a moisture content of 4% and thus crystallization.

Step 7. The crystallized layer-mixture was removed from the tray and pulverized in a POLIMIX® and model PX-MFC 90D pulverizer with a 70 mesh screen, obtaining crystals with an average particle size of 2 mm.

Step 8. The crystals obtained were subjected to a vibratory separation equipment with mesh number 80 to separate the maltodextrin D10, the time of subjection to the vibration was until the maltodextrin D10 was completely separated.

Step 9. The honey crystals, already free of maltodextrin D10, obtained in the previous step, had a hygroscopicity of 0.2 g/h, and color of light or dark amber honey.

Example 3. Comparison Between Liquid Bee Honey and Bee Honey Crystals Obtained in Example 1

In order to know the bromatological behavior of the bee honey crystals obtained in example 1, on Feb. 28, 2020, two samples of bee honey were submitted to a bromatological analysis in the laboratory of the Chamber of the Food Industry in Guadalajara, Jalisco, Mexico. One sample was the normal honey (liquid) and the other sample was the crystallized honey (granulated) obtained in example 1. The sample size of each sample was 0.5 kg. Table 1 shows the results obtained.

Crystallized (granulated) honey is the result of the crystallization process of products with high carbohydrate content (sugars) in which the property of monosaccharides and disaccharides to form crystals through their molecular structural arrangement forming a tetrahedral network is exploited, providing some advantages over a traditional crystallization process by nucleation.

A supersaturated solution of the type of monosaccharide or disaccharide to be crystallized is not required. In this crystallization process, the concentrated sample is solidified by means of an absorbent medium that diffuses the moisture and separates it from the carbohydrate mixture.

TABLE 1

Bromatological behavior and other characteristics between liquid honey and granulated honey.

| Features | Liquid honey | Granulated honey |
|---|---|---|
| Moisture (g/100 g) | 15.62 | 3.40 |
| Fat (g/100 g) | 0.09 | 0.26 |
| Protein (g/100 g) | 0.80 | 0.49 |
| Ash (g/100 g) | 0.15 | 0.17 |
| Carbohydrates (g/100 g) | 83.34 | 95.68 |
| Kilocalories (Kcal/100 g) | 336.57 | 386.10 |
| Dietary fiber (g/100 g) | 0.20 | 0.23 |
| Sugars (g/100 g) | 75.09 | 41.57 |
| Available carbohydrates (g/100 g) | 83.14 | 95.45 |
| Density g/mL | 1.420 | 1.400 |
| Total acidity meq/mL | 38 | 34.2 |

Notes: The percentage of relative uncertainty was considered considering a confidence level of 95% and a coverage factor of K=2. Available carbohydrates=total carbohydrates–dietary fiber. Available carbohydrates with those taken into account for the caloric calculation. The density of the granulated honey was reconstituted at the same concentration of soluble solids (81° Brix).

It does not purify carbohydrates, i.e. no special purification features are needed to obtain crystals of disaccharides (sucrose) or monosaccharides (fructose, glucose), allowing a molecular network between both carbohydrates, without interacting with high molecular weight molecules such as maltodextrin. This allows the network arrangement between different mono and disaccharides to trap other important nutritional molecules of products with high sugar content (bee honey or sweetening syrups) such as proteins, minerals, fatty acids, dietary fiber, as well as organic acids characteristic of honey, which cannot be achieved by crystallization by nucleation. It is important to mention that the energetic contribution and the composition are very similar to that of liquid bee honey, with the difference that crystal honey (granulated) contains less water content, so it presents an increase in each of its nutritional components. As for the decrease in sugars, and disaccharides present during the crystallization process, being difficult to return as a single molecule, however, the sweetness of the sugars is not lost when crystal honey sweetens the same as sucrose in a cup of 250 mL.

Reconstituting the crystallized honey (granulated) to the same ° Brix as the original bee honey (liquid) the density decreases, but remains in the range considered in bee honeys between 1.39 g/mL to 1.44 g/mL.

As for acidity, Table 1 shows that the organic acids present in granulated honey are only lost approximately 10%, which is not so significant.

The invention claimed is:

1. A method for crystallizing aqueous carbohydrate-containing substances, characterized in that it comprises:
    i) remove foreign matter from the aqueous substance containing carbohydrates;
    ii) mix the aqueous substance containing carbohydrates with at least a water absorbent medium until a mixture of semi-solid particles with a size of 3 mm on average is obtained;
    iii) distribute the above mixture in a 1 to 5 mm thick layer on a container;
    iv) heat the layer of the mixture from the previous step in a microwave oven at a power of 0.585 kWh per 1 kg of mixture for 30 to 180 sec;

v) cool the mixture layer to a temperature of −80 to 40° C. for 2 to 480 s;

vi) repeat steps iv) and v) consecutively until the mixture layer reaches a moisture content of 2 to 4% and thus crystallization;

vii) pulverize the crystallized layer-mixture until crystals with an average particle size of 2 mm are obtained;

viii) remove the water absorbent medium from the crystals of an aqueous substance containing carbohydrates, by vibration and sieving with mesh number 80, until the absorbent medium is separated; and ix) to recover the crystals from aqueous substance containing carbohydrates, obtained.

2. The method of claim 1, wherein the removal of foreign matter from the aqueous carbohydrate-containing substance is done with a rotary filter with mesh number 70, at 1000 rpm, for 1 min.

3. The method of claim 1, wherein the water-absorbing medium is D10-D20 maltodextrin, beta-cyclodextrin, starches, and/or a combination thereof.

4. The method according to claim 1, wherein the mixing of the aqueous carbohydrate-containing substance and the water-absorbent medium is done in a mixing apparatus, at 70 rpm, for 5 min.

5. The method according to claim 1, wherein the cooling of the mixed layer is done by removing it from the microwave apparatus, and allowing it to cool to room temperature and/or subjecting it in a freezer apparatus.

6. The method according to claim 1, wherein the number of consecutive repetitions of steps iv) and v) is 8 repetitions.

7. The method as claimed in claim 1, wherein the pulverizing the crystallized layer-mixture is done in a pulverizing apparatus having a number 70 mesh screen.

8. The method according to claim 1, wherein the removal of the water absorbent element is done with a vibratory separation equipment with mesh number 80.

9. The method according to claim 1, wherein the weight ratio of the water absorbent medium to the aqueous substance containing carbohydrates is 3:4-5.

* * * * *